INVENTORS
EDGAR REITZ
PAOLO NESTLER
BY
ATTORNEYS

United States Patent Office 3,480,346
Patented Nov. 25, 1969

3,480,346
REPRODUCTION APPARATUS AND SCREEN ARRANGEMENT FOR MOVING PICTURE THEATERS
Edgar Reitz and Paolo Nestler, Munich, Germany, assignors to Insel-Film GmbH & Co., a corporation of Germany
Filed Dec. 22, 1966, Ser. No. 603,948
Claims priority, application Germany, Dec. 23, 1965, J 29,710
Int. Cl. G03b 21/56, 31/00
U.S. Cl. 350—120
10 Claims

ABSTRACT OF THE DISCLOSURE

A motion picture screen has movable sections which are pivotable about an axis in the plane of the screen. The movable sections are driven by a motor which is controlled by a programmed signal such that movement of the screen sections is synchronized with the motion picture film being projected. Speakers are arranged to provide directional sound.

---

This invention relates to reproduction apparatus and screen arrangement for moving picture theaters.

To obtain special artistic and optical effects it is already known to project motion pictures taken in a stereo-photographic method. Such motion pictures give a three-dimensional impression of the scenes when seen through a pair of glasses made for the analglyphic or polarization method. Because of the expense of the stereo-photographic method and because of the high expenses for the glasses, their sensitivity to damage, and because of the reluctance of the audience to use such glasses, said glasses and particularly the analglyphic method were not successful. Further, a color reproduction is not possible by using the latter method.

It is also known in the stereoscopic picture technique to project laterally offset pictures adjacent to each other by means of several synchronized projectors onto a semicircular screen which comprises screen sections corresponding to the number of projectors and being arranged with respect to said projectors in such a manner as to provide a natural impression of a scene. In spite of the high costs of preparation and the rental fees for motion pictures and the structural difficulties which must be overcome in the installation of a semicircular screen, this method does not offer the possibility of using stereo or other special optic effects in an economically successful manner, particularly since they often make a bad impression on the audience, especially in the field of advertising and at fairs.

Therefore it is the purpose of the invention to further develop an arrangement of the above type based on economically useable means wherein even during projection of common one-dimensional movies surprising and extraordinary photographic effects can be achieved, which are addressed expressly to the aesthetic recognition ability of the audience and which provide many possibilities, especially in the modern technical and artistic conceptions in the advertising business and at fairs. This is attained according to the invention in that the screen comprises at least one self-supportingly constructed wall element which is pivotable about an axis positioned in the screen surface.

By this method which is simple to carry out, it is readily possible to achieve motion picture technical effects because, depending on the pivotal movement or position of the self-supporting wall element, selective control of the linearity or sizes of the photograph is available and can be increased as desired.

To obtain special effects the invention provides that a wall element is arranged in a recess of the screen of size corresponding thereto and that said recess is spaced from the portion of the auditorium wall immediately therebehind. By swinging the wall element out of the screen, the wall element breaks the reflection surface so that a view into said space therebehind is afforded. This results in many possibilities for motion picture technical experiments which will be discussed in more detail hereinafter.

In this connection it is useful for an advantageous embodiment of the invention that the wall element can be pivoted for at least 90 degrees from the plane of the screen. This offers the possibility of narrowing to a complete disappearing and again to widen as desired the portions of the picture appearing on the wall element.

Here the invention provides a useful further development that a pivot drive, controllable by a programming system, is arranged operatively with the wall element. This makes possible an artistically effective adjustment of the movements of the wall elements to the events shown in the pictures.

A preferable embodiment of the invention provides the wall element in the shape of an extended and upstanding rectangle, the long sides of which correspond to the screen height and extend parallel to the axis of rotation. This results in a simple arrangement to construct between the commonly provided horizontal beams of the screen frame.

An additional moving picture technical effect is possible according to a further embodiment of the invention, if at least two recesses communicating with one another are provided side-by-side and the wall elements of which meet, either by butt-jointing, or by overlapping each other, in a position essentially coplanar with the picture wall. Through simultaneous or successive outward swinging of the side-by-side arranged wall elements, the screen is divisible or, in the case of overlapping elements, the screen is transformable in step-like increments over smaller or larger areas.

In furtherance of the basic thought of the invention, said invention includes also the possibility that the screen in a known manner comprises sections arranged in cooperation with at least two projectors for simultaneous projection and that said sections extend horizontally and are arranged side-by-side and/or one behind the other. Such a screen arrangement can comprise, corresponding to the sizes of the auditorium, a plurality of screen sections each with a projector arranged therewith, so that extreme moving picture technical experiments can be carried out. Said experiments can be based on selective changes of the dimensions of portions of the picture, distortions of the picture linearity, views through the recesses from the front to the rearwardly positioned screen sections, or further is based on an artistic aesthetic combination of all such effects.

Further characteristics and advantages of the invention will be apparent by reading the following description and by inspecting the accompanying drawings which illustrate embodiments of the invention, whereby FIGURE 1 is a schematic perspective view of a moving picture screen arrangement according to the invention;

Figure 1:
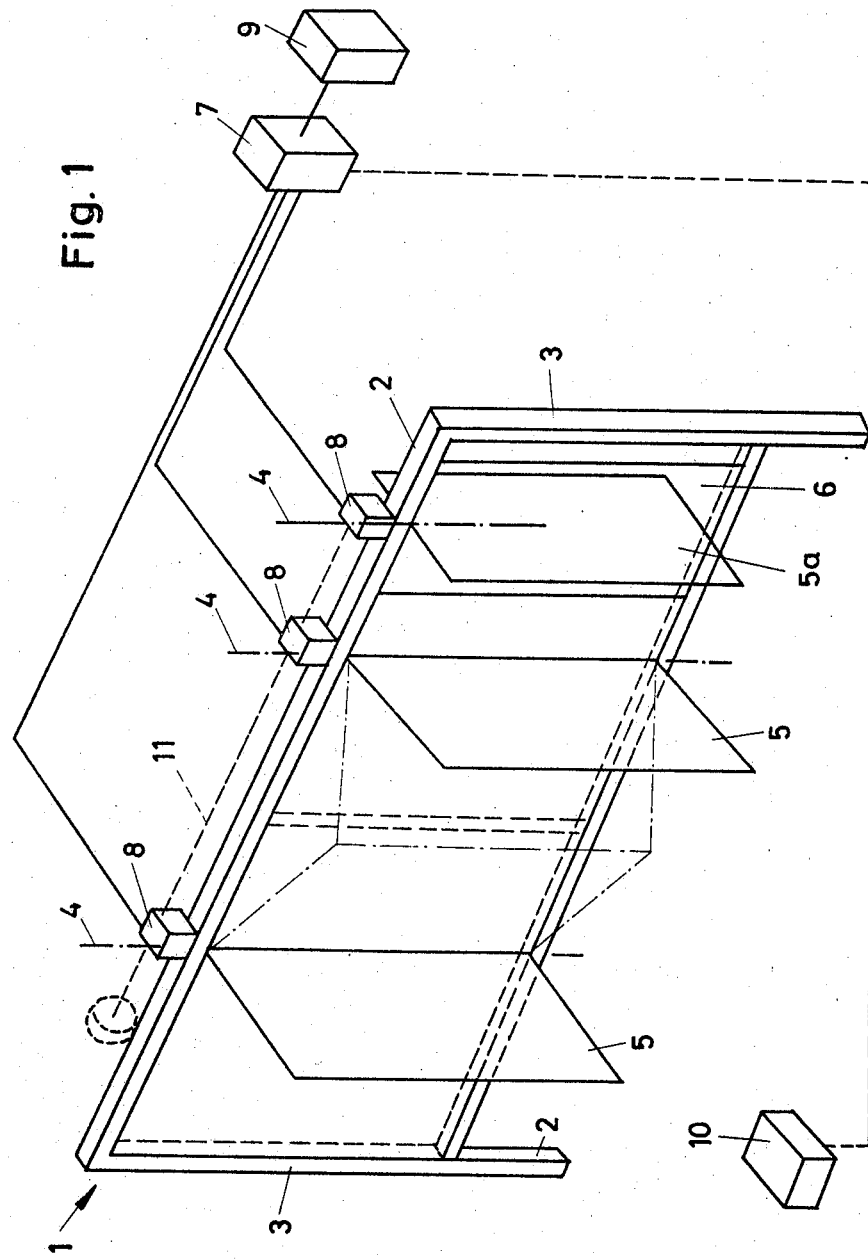

The principle of the invention can be clearly understood from FIGURE 1 which illustrates a moving picture screen 1 which for example is framed by beams 2, 3. According to the invention the screen 1 provides at least one self-supporting wall element 5 which is pivotable about an axis 4 being arranged in the moving picture screen surface. Said wall element is made advantageously of a wood fiber or a plastic plate.

If, according to FIGURE 1, two or more wall elements 5 are provided, they can be arranged essentially coplanar with the surface of the screen 1, either by overlapping (indicated in broken lines) or by butt-jointing. The wall elements, as is illustrated in full lines in FIGURE 1, are swingable out of the screen 1 for at least 90 degrees. Upon overlapping thereof, the surface of said elements can, as is illustrated in dash-dotted lines in FIGURE 1, either be deformed step-like or can be covered partially by the wall elements 5 swinging outwardly. In this manner, for each different location in the auditorium, different distortions of the picture and changes of its shape occur.

FIGURE 1 also shows on its right side a wall element 5a which is arranged in a recess 6 of the equal size in the screen 1 which, however, in this case must be spaced from the auditorium wall (not illustrated) positioned behind said screen.

It is an advantage that the wall elements 5 and also the recesses 6 are each shaped in the form of an extended rectangle with upright long sides, which essentially have the same height as the screen 1 and which extend parallel to the respective axes of the screens 5. Said axis can be arranged coinciding with one of the long sides or can be arranged between said sides as this is illustrated for wall element 5a. As a variation from this, however, the wall elements 5 and their respectively corresponding recesses 6 can be shaped to provide a variety of artistic purposes.

To adjust the pivotal motions or position of the wall elements 5 to the respective situation of the moving picture in a manner which will excite the interest of the audience, each wall element 5 is provided with a pivot drive 8 which can be operated by a programming system 7. The programming system 7 can be controlled manually, by magnetic or optic programming means 9 or, as illustrated in broken lines in FIGURE 1, it can be controlled by signals which are on the film, said film in turn running through a suitable reproduction device coordinated with the screen 1 for example in a projector 10.

The pivot drives 8 can each be comprised of an electric motor and the programming system 7 can comprise a relay switch arrangement. However, each pivot drive 8 may also comprise a rotatable gear with magnetic clutch which, depending on the pulses of the programming system 7, couples a designated gear to a continuously driven shaft 11 (illustrated in broken lines), which shaft also connects all pivot drives 8.

Figure 2:
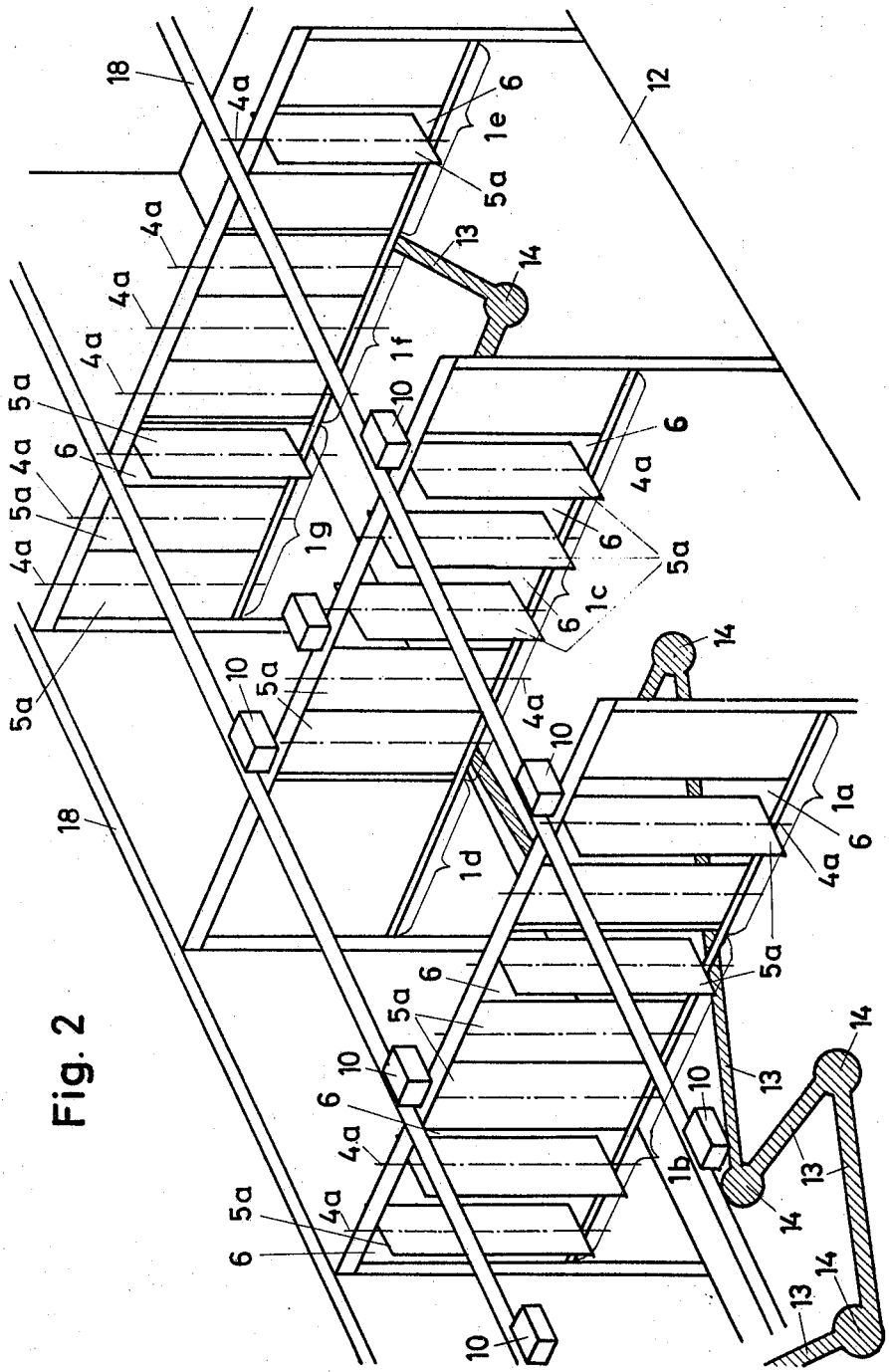
FIGURE 2 is a schematic perspective view of a moving picture screen arrangement for a simultaneous projection of several pictures.

FIGURE 2 illustrates the use of this invention in the advertising or display business. In FIGURE 2 the screen comprises, similar to the cinerama systems, screen sections 1a–1g for simultaneous projection through two or more projectors 10, the coplanar wall elements 5a being respectively related to each projector. The screen sections can be arranged side-by-side in a single plane or can be spaced in substantially parallel position one behind the other. FIGURE 2 illustrates an effective combination of these possibilities of arrangement in placing two or several screen sections side-by-side and by arranging the single rows one behind the other in the direction of the beam of the projector 10. Single screen sections, for example 1a, 1d, 1e–1g, normal and other sections, for example 1b, 1c, can hereby be of cinemascope shape.

The screen sections 1a–1g are each arranged at least at a standing height distance from the floor 12 of the auditorium so that the audience can find optimal points of observation of the individual screen sections. To make such finding easy, the floor 12 comprises suitable markings 13, 14, the first of which are intended to stimulate the spectator to proceed and the latter of which are intended to stimulate the spectator to remain at his place.

FIGURE 2 further discloses that in single screen sections there can be arranged two or several recesses 6 which extend from one section to the next section, the wall elements 5a within said recesses being coplanar with the respective section plane and, as has been discussed above, in butt-jointing or partially overlapping relationship with each other. With the wall elements 5a open, this results for the spectator who stands on the respective marking point 14 (FIGURE 2), near the screen recesses 1b, 1c, to view large areas of one or more of the screen sections arranged there behind. The latter rows 1e–1g, as mentioned above, are spaced a distance from wall 13 of the auditorium which is adjacent thereto in the direction of the beam of the projector 10.

Figure 3:
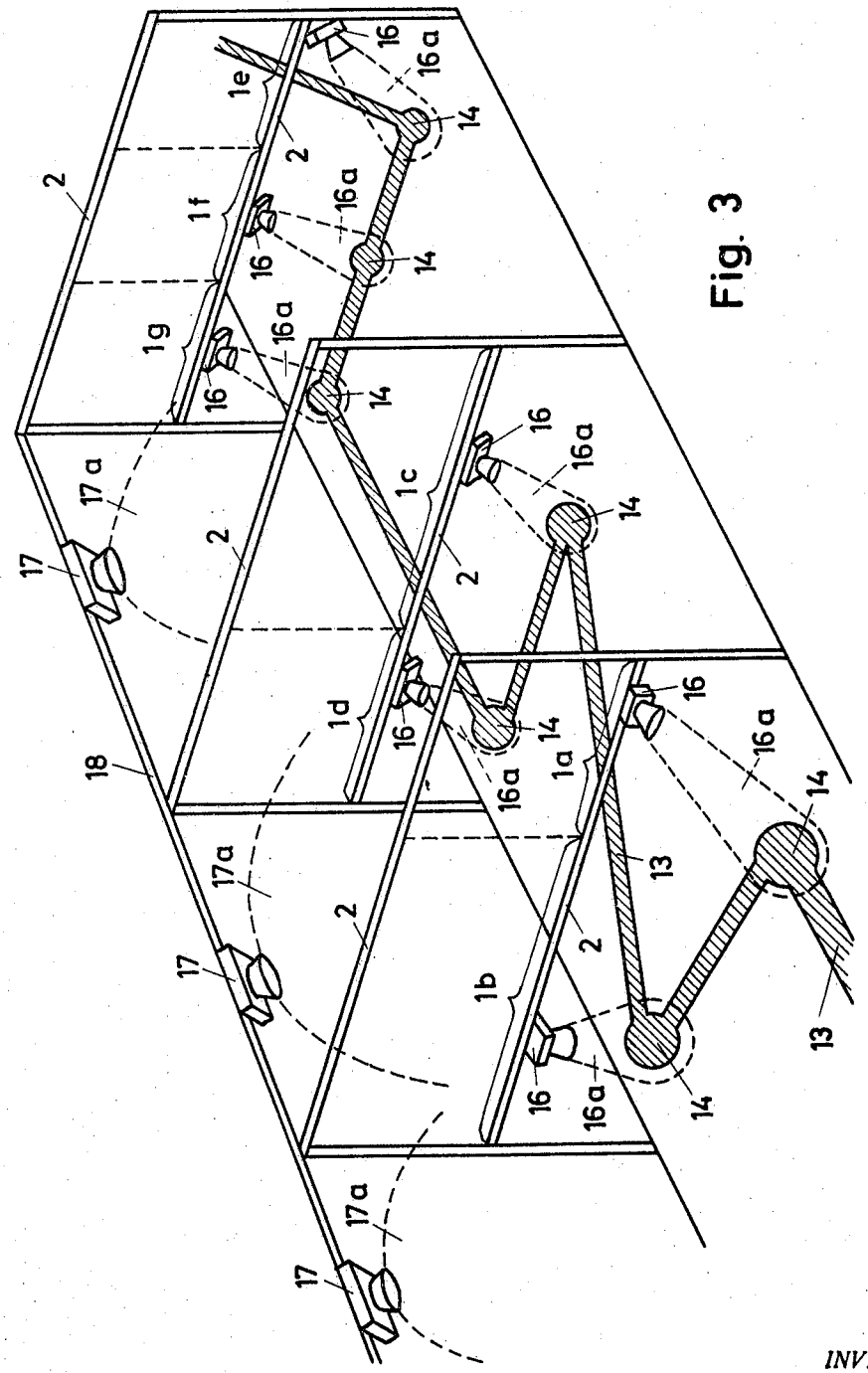
FIGURE 3 is a schematic perspective view of an arrangement of sound reproduction devices according to the moving picture screen arrangement of FIGURE 2.

FIGURE 3 illustrates an advantageous addition to the screen arrangement according to FIGURE 2, namely an acoustic sound reproduction device or loud speaker arrangement when an amplification unit 5 is provided and when projectors 10 (not illustrated in FIGURE 3, see FIGURE 4) are provided which are suitable for sound film production.

Assuming that each one of the projectors 10 illustrated in FIGURE 2 is a sound film projector, each one of said projectors can control a loud-speaker 16 through one of the channels 15a, b, c, d, etc. said loud-speaker having a directional characteristic 16a, which encloses only the optimal point of observation 14 of the screen sections 1a–1g assigned to the sound film projector 10. A mounting frame can be used for mounting the projectors 10 and loud-speakers 16 whereby, however, the latter are preferably arranged on the horizontal beams 2 underneath the picture wall sections. Such an arrangement of a sound reproduction device makes possible a radiation of sound or speech appropriate for each single point of observation 14 independent from the others, said sound of speech coordinated with the film happenings of the respective screen section.

Figure 4:
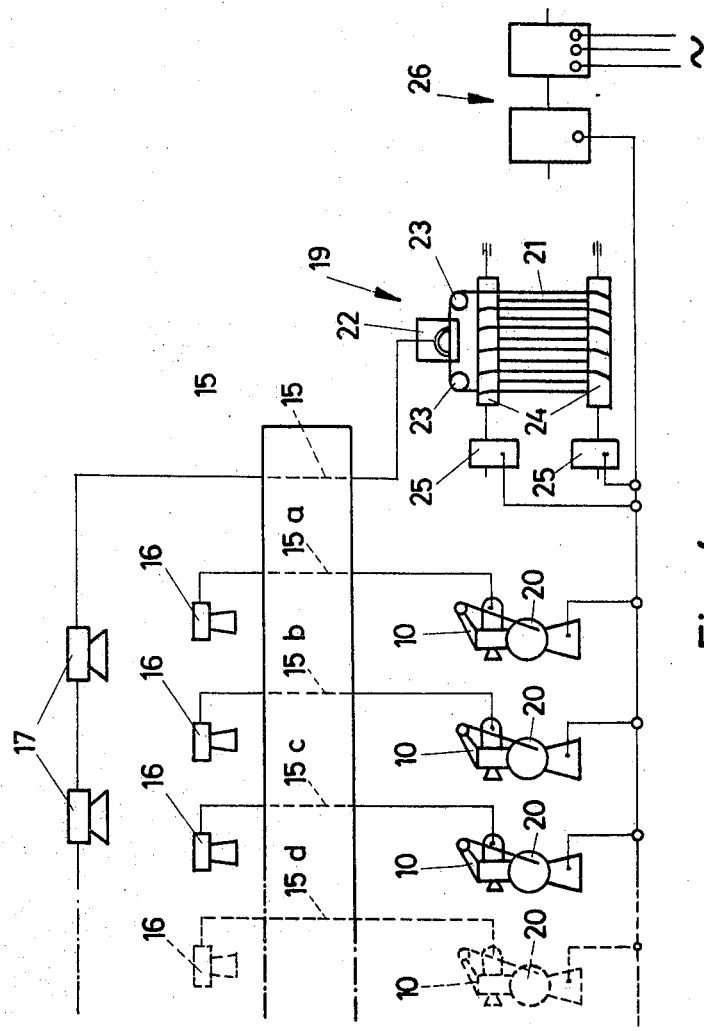
FIGURE 4 is a schematically illustrated arrangement of cross connections of the picture and sound reproduction devices according to FIGURES 2 and 3.

A further embodiment of the loud-speaker arrangement can be achieved in that at least a loud-speaker 17, which is arranged essentially above the screen sections 1a–1g and which has a wide beam characteristic 17a, can be controlled through a further channel, for example 15e, of the sound magnifier arrangement 15 by means of a sound storage device 19. The independent control of the loud-speakers 16, 17 makes it possible to superimpose the acoustic frequencies sent out by loud-speaker 17 over the directional acoustic radiation of each point of observation 14, which frequencies can be heard throughout the auditorium at substantially equal intensity. All the projectors 10 including the sound storage 19 can also be driven synchronously as this is also illustrated in FIGURE 4. This makes it possible to develop an impressive combination of sounds emphasizing at the observation points 14 the happenings in the movie on each picture wall section 1a–1g, and, for example, to communicate with the observer in an attention arresting manner.

Especially at fairs and exhibitions where the customers must have a chance to visit the exhibition place at any time and for any length of time, it is advantageous if all of the projectors 10 comprise endless film holders 20 and if the sound storage 19 comprises an endless tape holder, so that a continuous repetition of the production takes place.

In cases where a high sound quality from the loud-speakers 17 is desired and consequently a high tape speed within sound storage means 19 would be required, the consequently very long tape or a magnetic film 21 can be guided outside of a tape recorder 22 over rollers 23 and/or rolls 24 which are driven synchronously with the projectors 10 by at least one motor 25.

For the synchronous running of the projectors 10, the number of which can be smaller or higher than the ones illustrated in FIGURES 2 to 4, and of the sound storage means 19, a frequency changer 26 is advantageously provided, which upon starting of the apparatus is driven from zero to the operating frequency.

This invention is not limited to the embodiments illustrated in the drawings but can be used within the scope of the following claims in any useful manner. Furthermore all characteristics and details of arrangement which are disclosed in the drawings and the specification can be inventive alone or in any desired combination.

The embodiments of the invention in which an exclusive property or privilege is claimed are defined as follows:

1. Reproduction apparatus and screen arrangement for motion picture theaters comprising planar screen means having at least one screen section therein which is movable by a drive motor relative to the projection axis of an associated and programmed projector, said screen section being supported for swingable movement into and out of the plane of said screen means about a pivot axis which is generally parallel to said screen means, a programmed signal generating device connected in controlling relationship to said drive motor for controlling said drive motor and the movement of said screen section in synchronism with said programmed projector.

2. Reproduction apparatus and screen arrangement according to claim 1, wherein said screen means comprises a frame having a recess therein, said screen section being pivotally mounted in said recess in an aligned position with said plane of said screen means, said pivot axis being located centrally of said screen section.

3. Reproduction apparatus and screen arrangement according to claim 1, wherein the program for said programmed projector and said programmed signal generating device is a motion picture film, and wherein said film is provided with control signals which control said drive motor of the screen section.

4. Reproduction apparatus and screen arrangement according to claim 1, wherein said screen means comprises at least two screen sections each associated with projectors, and that said screen sections are arranged in a common plane one beside the other.

5. Reproduction apparatus and screen arrangement according to claim 4, wherein said at least two screen sections have differing widths.

6. Reproduction apparatus and screen arrangement according to claim 4, wherein said screen means is spaced from the floor of an auditorium a distance permitting people to pass therebeneath, and wherein said floor of said auditorium has markings thereon for marking the optimum observation points of said screen means.

7. Reproduction apparatus and screen arrangement according to claim 6, including a plurality of projectors which are equipped for sound film projection, and in which a lound speaker is associated with each projector, said loud speaker being controllable to focus the sound to only said optimum observation points of the screen means associated with each projector.

8. Reproduction apparatus and screen arrangement according to claim 7, wherein at least one loud speaker having wide angle characteristics is arranged above said screen sections and is controllable, independently of the projectors and the films projected through said projectors, by a sound storage system.

9. Reproduction apparatus and screen arrangement according to claim 8, wrerein said sound storage system is an endless band sound recording drivable through a driving gear.

10. Reproduction apparatus and screen arrangement according to claim 8, wherein said at least two projectors and said sound storage system can be driven together through a frequency changer from zero to the rated synchronous speed.

References Cited

FOREIGN PATENTS 1,130,692    5/1962    Germany.

OTHER REFERENCES

Cinemascope: What it is, How it Works. In International Projectionist 28(4): pp. 7–10, April 1953.

NORTON ANSHER, Primary Examiner

M. H. HAYES, Assistant Examiner.

U.S. Cl. X.R.

350—118; 352—3